United States Patent
Clifford-Brown

(10) Patent No.: US 11,459,055 B2
(45) Date of Patent: Oct. 4, 2022

(54) BICYCLE STEM INCLUDING AN ELECTRICAL DEVICE

(71) Applicant: Rupert Clifford-Brown, Chichester (GB)

(72) Inventor: Rupert Clifford-Brown, Chichester (GB)

( * ) Notice: Subject to any disclaimer, the term of this patent is extended or adjusted under 35 U.S.C. 154(b) by 101 days.

(21) Appl. No.: 16/607,525

(22) PCT Filed: Apr. 23, 2018

(86) PCT No.: PCT/GB2018/051056
§ 371 (c)(1),
(2) Date: Oct. 23, 2019

(87) PCT Pub. No.: WO2018/197847
PCT Pub. Date: Nov. 1, 2018

(65) Prior Publication Data
US 2020/0047842 A1    Feb. 13, 2020

(30) Foreign Application Priority Data

Apr. 25, 2017 (GB) ..................................... 1706595
Jul. 3, 2017 (GB) ..................................... 1710678

(51) Int. Cl.
*B62K 21/12* (2006.01)
*B62J 45/20* (2020.01)
(Continued)

(52) U.S. Cl.
CPC ............... *B62K 21/12* (2013.01); *B62J 11/13* (2020.02); *B62J 45/20* (2020.02); *B62J 50/22* (2020.02); *B62J 50/225* (2020.02); *B62M 25/08* (2013.01)

(58) Field of Classification Search
CPC . B62K 21/12; B62J 99/00; B62J 45/20; B62J 50/225
See application file for complete search history.

(56) References Cited

U.S. PATENT DOCUMENTS 4,435,983 A    3/1984  Shimano
4,489,307 A   12/1984  Nagano
(Continued)

FOREIGN PATENT DOCUMENTS

CN    1579872 A    2/2005
CN   202243809 U    5/2012
(Continued)

OTHER PUBLICATIONS

International search Report with Written Opinion for related Application No. PCT/GB2018/051056 dated Jul. 30, 2018 (12 pages).
(Continued)

*Primary Examiner* — Tony H Winner
*Assistant Examiner* — Michael R Stabley
(74) *Attorney, Agent, or Firm* — Michael Best & Friedrich LLP

(57) ABSTRACT

A stem for a bicycle comprises a body (14), an electrical device such as a power storage means (20), and a connecting means (24, 26). The body (14) has first and second apertures therein. The electrical device is located within the body. The connecting means enables electrical connection through the at least one first aperture, to enable supply of power to the device. The second aperture enables insertion of the device into the body and removal therefrom. A handlebar can be attached to the stem over the second aperture.

20 Claims, 12 Drawing Sheets

(51) Int. Cl.
*B62J 50/22* (2020.01)
*B62J 50/21* (2020.01)
*B62J 11/13* (2020.01)
*B62M 25/08* (2006.01)

(56) References Cited

U.S. PATENT DOCUMENTS

| | | | |
|---|---|---|---|
| 6,428,192 B1* | 8/2002 | Chen | B62J 6/02 |
| | | | 362/191 |
| 6,584,872 B1* | 7/2003 | Kojima | B62K 21/125 |
| | | | 74/551.8 |
| 6,981,413 B2* | 1/2006 | Kinoshita | B62J 99/00 |
| | | | 73/493 |
| 7,055,394 B2* | 6/2006 | Kinoshita | B62K 21/12 |
| | | | 73/856 |
| 8,177,249 B2* | 5/2012 | Servet | B62K 21/16 |
| | | | 280/279 |
| 8,783,429 B2* | 7/2014 | Moore | B62K 23/06 |
| | | | 188/344 |
| 9,004,245 B2* | 4/2015 | Moore | B62L 3/023 |
| | | | 188/344 |
| 9,327,787 B1* | 5/2016 | Chen | B62K 21/12 |
| 9,937,977 B2* | 4/2018 | Fukao | B62K 23/06 |
| 2002/0166406 A1 | 11/2002 | Dunlap | |
| 2010/0282017 A1* | 11/2010 | Hermansen | B62K 25/02 |
| | | | 74/551.3 |
| 2014/0166847 A1* | 6/2014 | Moore | B62L 3/023 |
| | | | 248/674 |
| 2017/0046552 A1 | 2/2017 | Li | |

FOREIGN PATENT DOCUMENTS

| | | |
|---|---|---|
| CN | 204871424 U | 12/2015 |
| CN | 205365943 U | 7/2016 |
| CN | 206031662 U | 3/2017 |
| DE | 202013103030 U1 | 10/2013 |
| GB | 479213 A | 2/1938 |
| GB | 694255 A | 7/1953 |
| GB | 2469495 A | 10/2010 |
| KR | 20090003149 U | 4/2009 |

OTHER PUBLICATIONS

International Preliminary Report on Patentability for related Application No. PCT/GB2018/051056 dated Nov. 7, 2019 (10 pages).
Intellectual Property Office People's Republic of China Office Action and Search Report for Application No. 201880041748.2 dated Dec. 3, 2020 (16 pages including English summary).
United Kingdom Intellectual Property Office Search Report for Application No. GB1706595.4 dated Oct. 3, 2017 (1 page).

* cited by examiner

BICYCLE STEM INCLUDING AN ELECTRICAL DEVICE

RELATED APPLICATION DATA

The present application is a U.S. National Phase application of PCT/GB2018/051056 filed Apr. 23, 2018, which claims priority to Application No. GB 1706595.4, filed Apr. 25, 2017 and GB 1710678.2, filed Jul. 3, 2017, the entire contents of these applications are herein incorporated by reference.

FIELD OF THE INVENTION

The invention relates to a bicycle stem comprising an electric device, and a method of locating an electrical device in a bicycle stem.

BACKGROUND

Devices requiring a power source are frequently used when riding a bicycle. For example, lights are required at night and require power. Also, navigation and data recording devices are often used by cyclists. Power availability limits the functionality of such devices and length of time over which such devices can operate. Smartphones typically include all components necessary for navigation, but are not used for such due to drain on battery. It is an object of the present invention to address the above-mentioned issues.

SUMMARY OF THE INVENTION

In accordance with a first aspect of the present invention, there is provided a stem for a bicycle, comprising: a body having at least one first aperture and a second aperture therein; an electrical device located within the body; connecting means enables electrical connection through the at least one first aperture, to enable supply of power to the device, wherein the second aperture enables insertion of the device into the body and removal therefrom, and wherein a handlebar attaches to the stem over the second aperture.

Location of the power storage device in the stem through the second aperture is useful. The second aperture may be a size enabling most or all available space inside the body to be used for retaining the power storage device. The location of the second aperture such that the handlebar locates over it means that the second aperture is not detrimental to the strength of the stem in a way that an aperture of such size enabling access to the interior of the body located elsewhere in the stem would be.

In accordance with a second aspect of the present invention, there is provided a method of locating a device in a stem of a bicycle, comprising: inserting a device through a second aperture in a body of the stem and locating connecting means inserted through the second aperture at at least one first aperture in the body; attaching a handlebar to the stem, wherein the attached handlebar covers the second aperture, wherein the connecting means enables electrical connection through the at least one first aperture for supply of power to the device.

BRIEF DESCRIPTION OF THE FIGURES

For better understanding of the present invention, embodiments will now be described, by way of example only, with reference to the accompanying Figures in which.

DETAILED DESCRIPTION OF EMBODIMENTS

Figure 1:
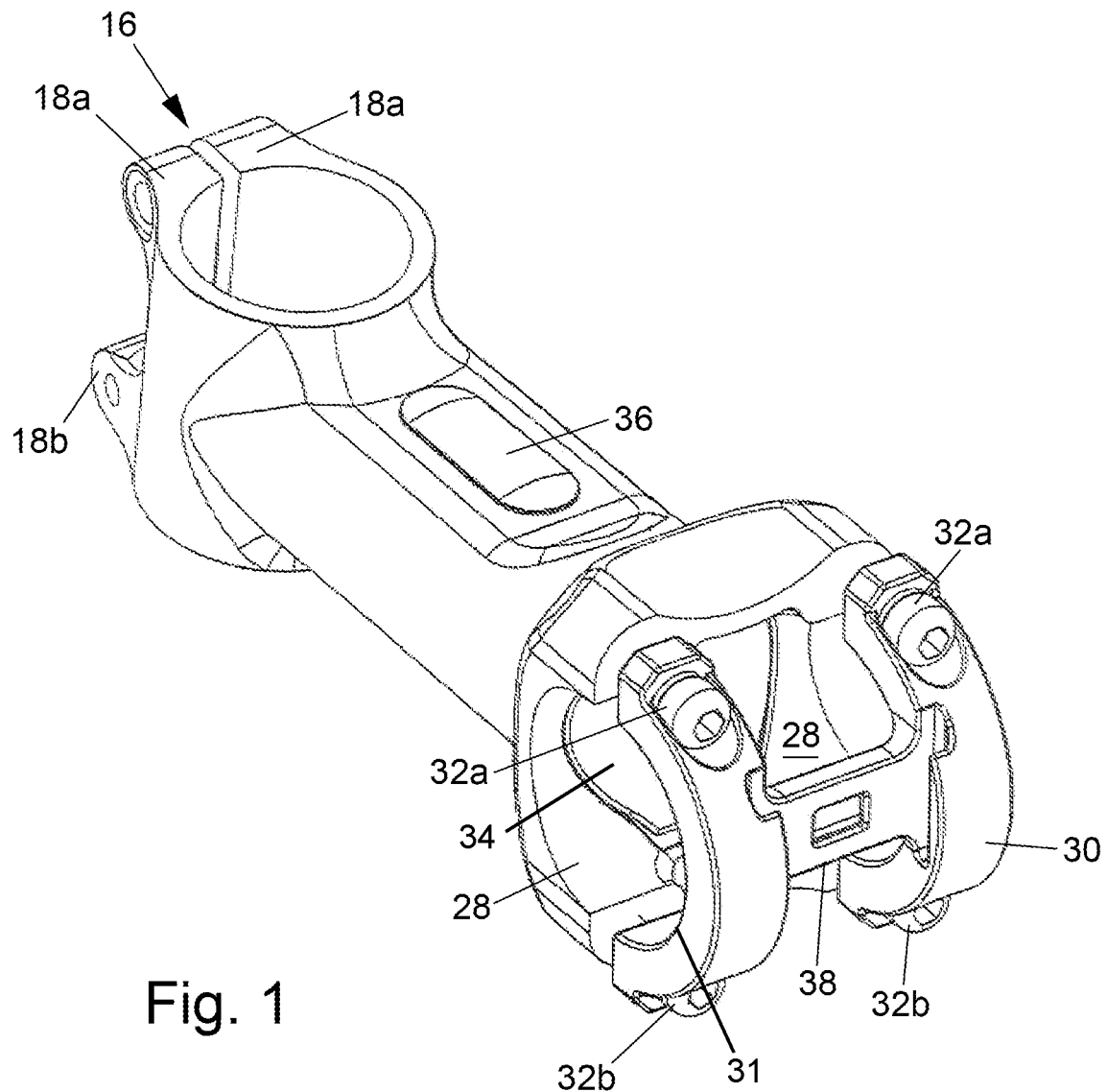
FIG. 1 is perspective view of a stem in accordance with an embodiment.
Figure 2:
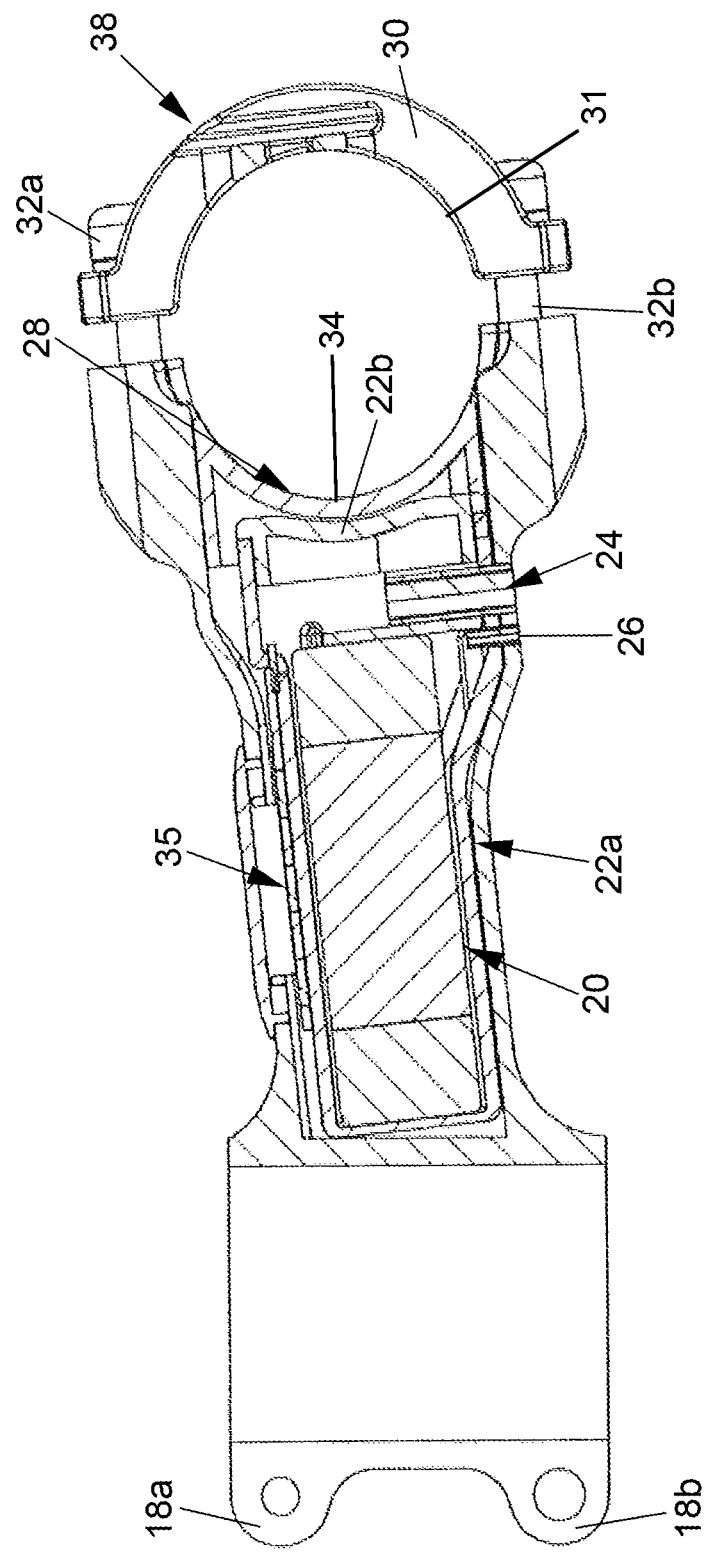
FIG. 2 is a cross-sectional view of the stem along section A-A indicated in FIG. 3.
Figure 3:
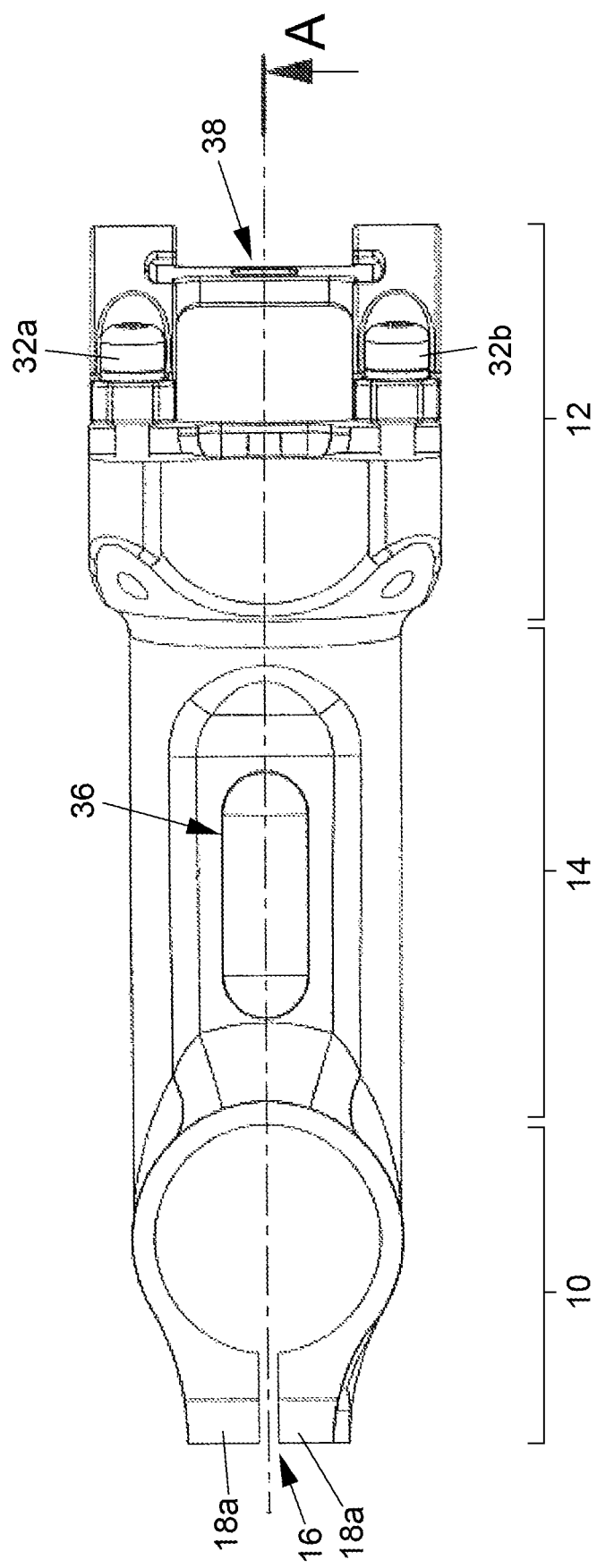
FIG. 3 is a top view of the stem.
Figure 4:
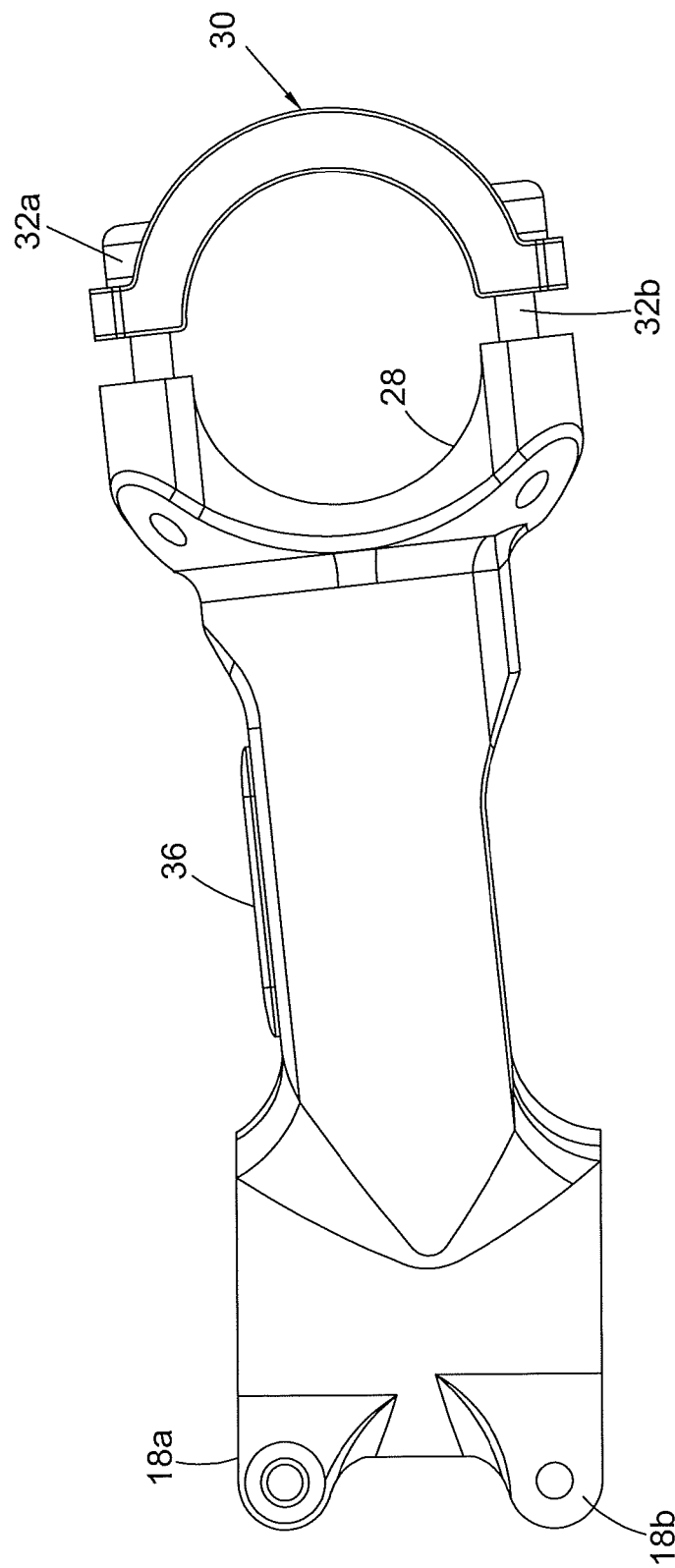
FIG. 4 is a side view of the stem.
Figure 5:
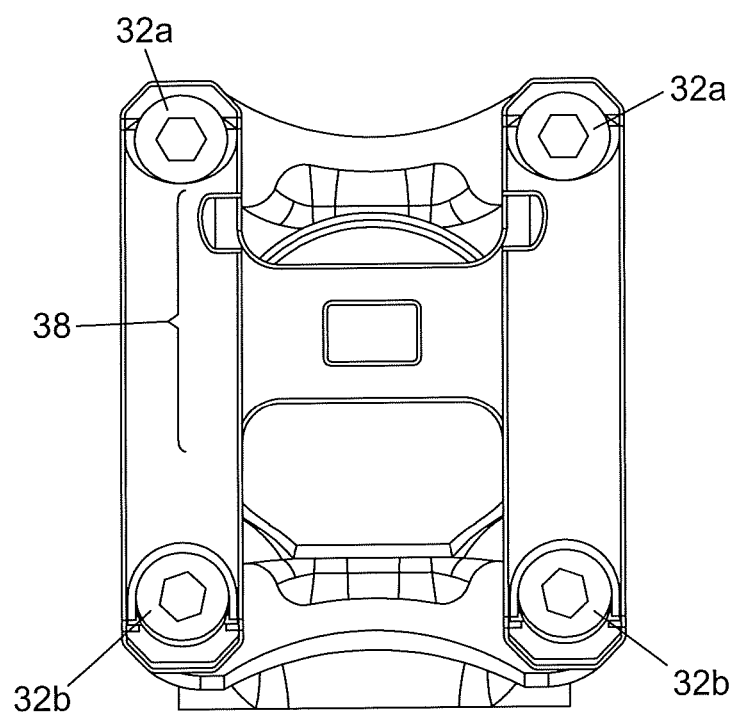
FIG. 5 is an end view of the stem, from an end at which a handlebar is attached in use.
Figure 6:
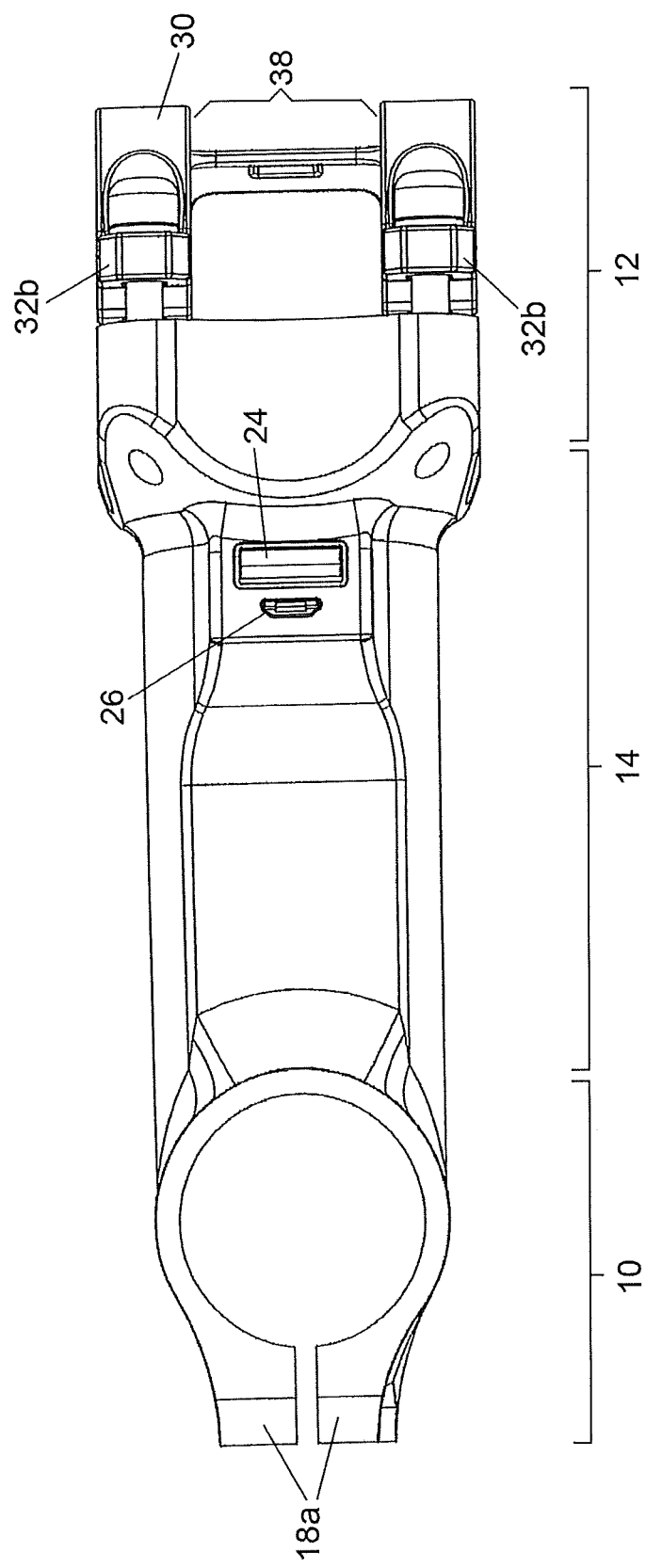
FIG. 6 is an underside view of the stem.
Figure 7:
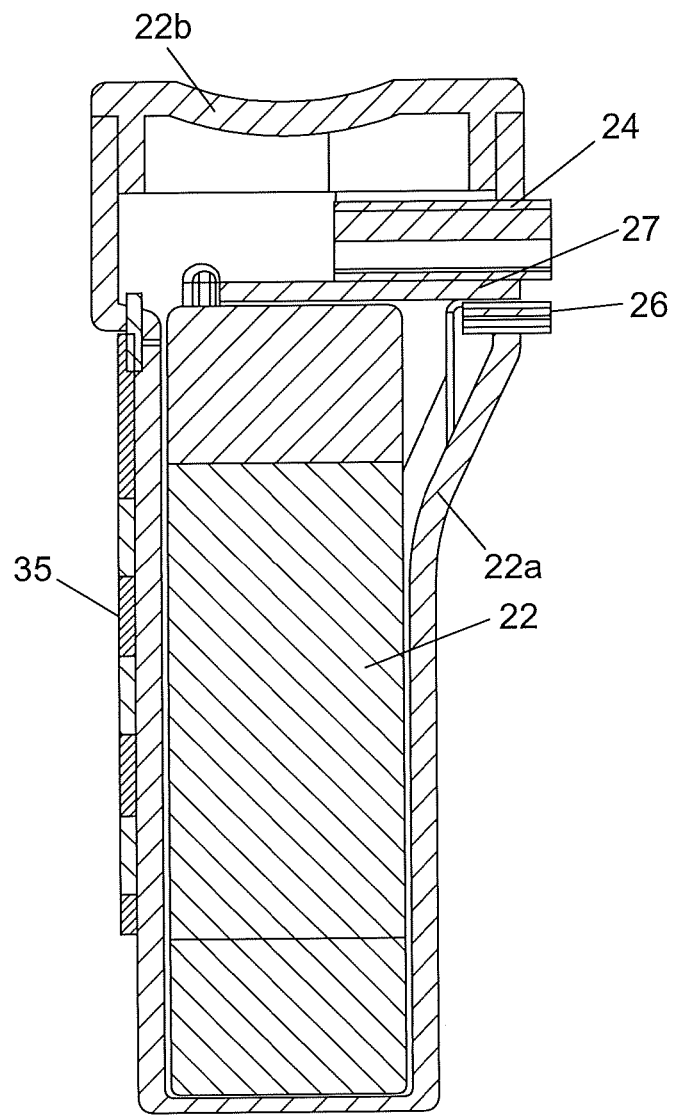
FIG. 7 is a cross-sectional view of a capsule shown in FIG. 2, also along section A-A, now shown separately.
Figure 8:
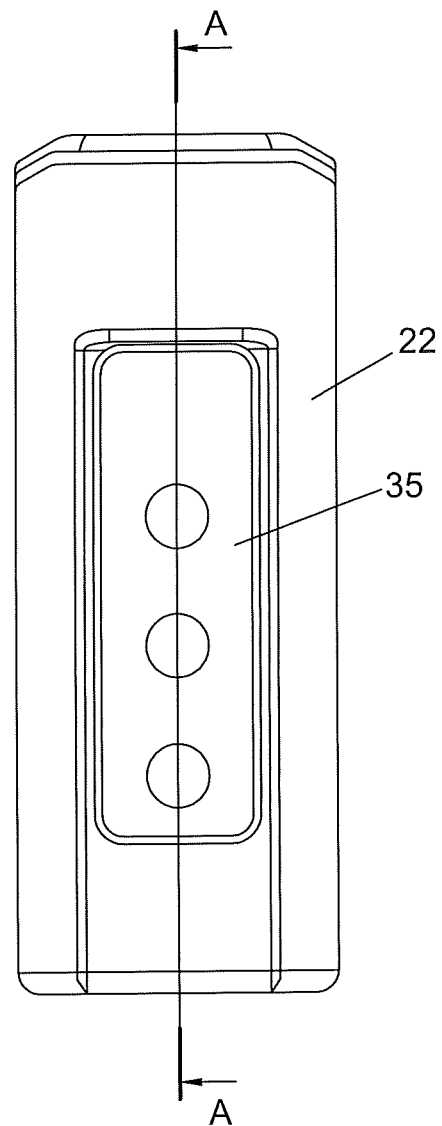
FIG. 8 is a top view of the capsule.
Figure 9:
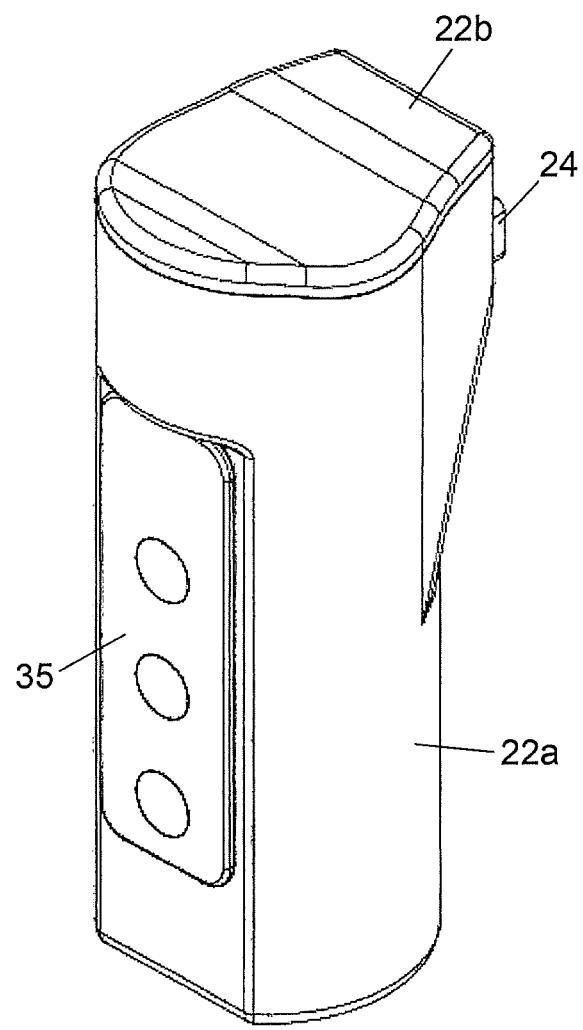
FIG. 9 is a perspective view of the capsule.
Figure 10:
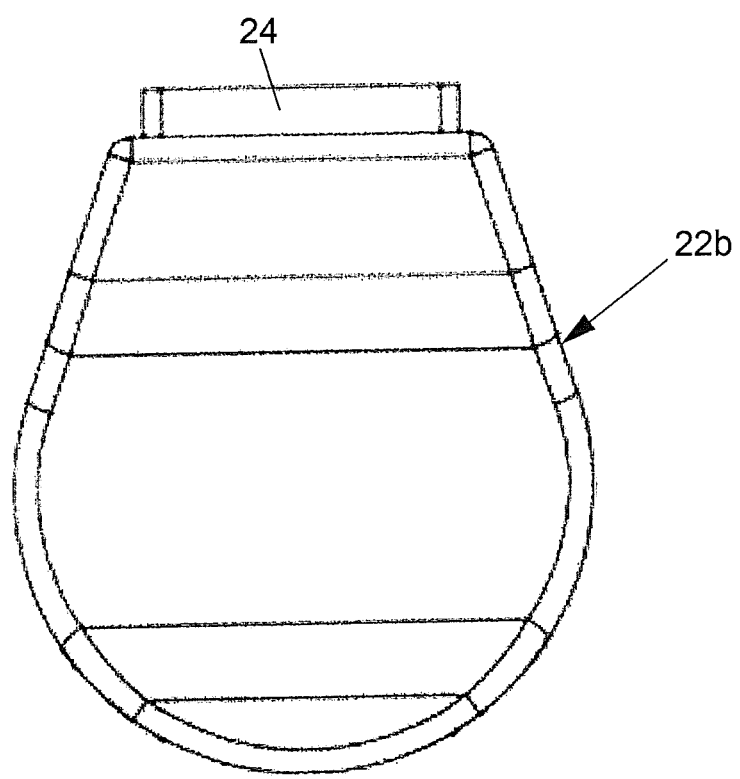
FIG. 10 is an end view of the capsule.

Like reference numerals are used to denote like parts throughout.

Embodiments of the invention relate to a stem in which a power supply device is located and stored. Embodiments of the invention are not limited to location of a power supply device in the stem. Other types of device may be located there instead.

Certain terminology will be used in the following description for convenience and reference only, and is not to be understood as limiting. For example, a bicycle has a conventional orientation and the words "upper" and "lower", and "top" and "bottom" are to be construed in view of that orientation.

Referring to FIGS. 1 to 6, a stem for a bicycle comprises a body formed of a single piece of material, and also means for attaching a handlebar and an end of a fork. The material may be aluminium, steel, titanium, or carbon fibre based, for example. The stem has a first section 10 configured for connecting to the fork, in a conventional way. The stem also has a second section 12 configured for attaching to the handlebar. The stem has a third section 14 extending between the first section 10 and the second section 12. In the conventional way, the stem connects the handlebar to the fork so that the bicycle can be steered.

The first section 10 provides a tube of cylindrical cross-section, locatable over a top end of the fork. The first section 10 includes a gap 16 extending longitudinally therein with respect to a length of the tube. The gap 16 is located in a side of the tube remote from the third section 14. The first section 10 also has a bolt and aperture arrangement configured so that bolts can be tightened to reduce the gap 16, thereby to clamp the first section 10 to the top end of the fork.

The bolt and aperture arrangement comprises upper and lower pairs of projecting portions 18a, 18b extending away from the third section 14, one projecting portion of each pair being on a respective side of the gap 16. The projecting portions 18a, 18b each have a respective aperture therein, and the apertures of each pair are in register. Although not shown in the Figures, a respective bolt extends through the apertures of each pair, and is attached by a nut that sits flush against one of the projecting portions 18a, 18b of each pair. Thus, the bolt can be tightened to clamp the projecting portions 18a, 18b of each pair together, so as to press closed the gap 16. Other methods of attaching a stem to an end of a fork are known in the art and may be used instead.

The third section 14 is tubular and defines a hollow space in which a capsule, shown separately from the rest of the stem in FIGS. 7 to 10, containing a power storage and supply device 20 is located. The third section 14 has first and second holes in a portion of the third section 14 that faces downwardly when in use. The third section 14 also has a third hole in an upper portion thereof.

The capsule comprises a housing in the form of casing 22 configured to fit flush against or abut the surrounding surfaces of the third section 14, so that the casing 22 is fixedly located and does not rattle in the stem when the bicycle is ridden. The casing 22 has first and second connectors 24, 26 attached thereto. The casing 22 is shaped for location in the third section 14, and the casing 22 and the first and second connectors 24, 26 are relatively disposed, so that the first and second connectors 24, 26 extend downwardly into the first and second holes in the third section 14.

The first connector 24 is located in the first hole. The first connector 24 is configured and oriented so that a further connector that is configured for mating with the first connector 24 can be operatively attached. The first connector 24 is operatively connected to the power supply device 20. The further connector may be electrically connected to an external device, so that the external device can be powered with power from the power supply device 20. The first connector 24 may, for example, be a connector according to a USB (Universal Serial Bus) standard. The first connector 24 may be configured according to USB standard A port, since cables are commonly available for connecting such to external devices.

A second connector 26 is located in the second hole. The second connector 26 is configured and oriented so that a yet further connector that is configured for mating with the second connector 26 can be operatively attached. The yet further connector may be electrically connected to an external device, for supply of power from the power supply device 20 to the external device. The second connector 26 may, for example, be a connector according to another USB (Universal Serial Bus) standard, different to the USB standard of the first connector 24. The second connector 26 is typically configured for connecting to a power source for charging of the power supply device 20, and the USB standard may be a micro-USB standard.

The first and second connectors 24, 26 do not have to be configured according to USB standards. The first and second connectors 24, 26 may be otherwise configured.

The first and second connectors 24, 26 may in alternative embodiments be operatively connected to the power supply device 20 by a respective short cable.

Each of the first and second connectors 24, 26 have a rubber sheath (not shown) extending therearound, to seal between the respective connector and the third section 14, thereby to prevent ingress of ambient dirt and moisture. Although not shown in the Figures, each of the first and second connectors 24, 26 is also equipped with a rubber cover, to prevent ingress of ambient dirt and moisture into the connector.

In variant embodiments, only a single hole may be provided in the third section 14 in place of the first and second holes. In this case both first and second connectors 24, 26 may be attached together and located in the single hole, or only a single connector may be provided configured for both charging of the power supply device 20 and for supply of power to external devices.

The casing 22 comprises a first casing portion 22a shaped to receive the power supply device 20. The casing 22 also comprises an end cap 22b. The first casing portion 22a and the end cap 22b are configured so that the end cap 22b closes the first casing portion 22a, so that the power supply device 20 is contained within the casing 22.

The second section 12 provides a first concave surface 28 for location flush against the handlebar. Although not shown, the handlebar has a cylindrical cross-section and the first concave surface 28 is configured to locate flush against a portion of an outer surface of the handlebar. A clamp member 30 providing second concave surfaces 31 is located facing the first concave surface 28. The clamp member 30 has a pair of apertures therein through each of which a respective bolt 32a, 32b extends. The second section 12 also has a pair of apertures therein, each aligned with a respective one of the apertures of the clamp member 30. The bolts extend through the apertures and are attached with a nut. Tightening of the bolt clamps the clamping member 30 against the handlebar, thereby securing the handlebar to the stem. In variant embodiments, alternative ways of attaching the handlebar may be employed.

The clamp member 30 is configured to provide a mount 38 for mounting an external device in the form of a front bicycle light onto the stem, where the front bicycle light is configured for mounting on the mount 38. Alternatively, the mount 38 may enable mounting of a suitably configured navigation device, data recording device or mobile phone. A particular configuration of the mount 38 is shown in the figures, but mounts for mounting lights, navigation devices and data recording devices on bicycles are well known in the art and any suitable mounting system may be implemented.

The second section 12 has an opening provided in the first concave surface 28 through which the casing 22 can be inserted in the third section 14. The opening is sealed and closed with removable closure 34. The closure 34 is shaped for conformity with the first concave surface 28, so that the closure 34 fits flush against the surface of the handlebar. The casing 22, with the power supply device 20 inside, can be positioned in the second section 12 with the first and second connectors 24, 26 located respectively through the first and second apertures in the second section 12. The closure 34 may be configured to fit in the opening so as to secure to the stem, but alternatively the handlebar may play a role in securing the closure 34 in place.

In a variant embodiment, the closure 34 is absent. In this case, the handlebar should cover the opening completely to seal the opening, thereby to prevent ingress of moisture and dirt.

The power supply device 20 comprises a circuit board 27 comprising control circuitry 27 including a microcontroller operatively connected to a display 35, the connectors 24, 26 and a battery. The microcontroller comprises a processor, a memory, a clock, and input/output interfaces operatively connected by a bus. Computer program codes are stored in the memory which, when executed by the processor, result in the microcontroller 20 controlling the display.

The display 35 is located so as to be viewable during riding of the bicycle through the third aperture. The display 35 is in the form of a circuit board with three LEDs on. An upper surface of the third section 14 has a see-through cap 36 providing a window through which the display 35 can be seen by the rider. The microcontroller is configured to control display of the display 35 to show information indicative of available power in the battery using the LEDs. The display 35 may be otherwise configured, for example with a screen.

In a variant embodiment, additionally or alternatively to the display 35, solar cells may be exposed to light through the third aperture. Additionally or alternatively, solar cells may be located around the stem, or elsewhere on the bicycle and connected to the battery via the first or second connector 24, 26. The solar cells operate to charge the battery.

To make the stem described above, the capsule 22 and the first and second connectors 24, 26 are inserted into the tubular body of the stem through the opening. The capsule 22 is sized and shaped relative to the interior of the third section 14 so that the capsule 22 fits snugly into place, and the first and second connectors 24, 26 locate into the first and second holes in the third section 14. The capsule 22 is also thus oriented so that the display 35 is underneath the see-through cap 36 and thus visible to the rider.

The closure 34 is then located to close the opening. The handlebar is then attached.

The power supply device 20 may be part of an electronic gear change system. The power supply device 20 may be connected to other parts of the electronic gear change system external to the stem via the first and/or second connectors 24, 26.

As mentioned above, types of device other than a power supply device may be located in the stem instead of the power supply device 20. For example, other parts of an electronic gear change system may be stored in the stem. The display may be configured to display a visual indication of data supplied by the device, without limitation.

Figure 11:
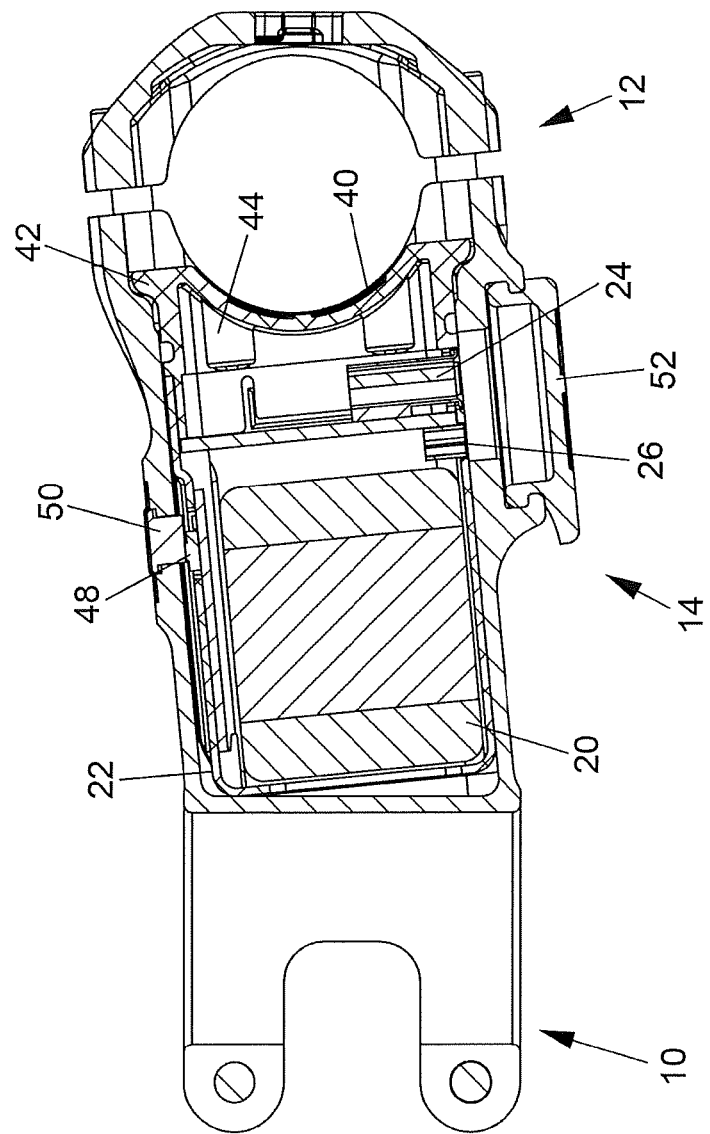
FIG. 11 is a sectional side view of an alternative embodiment of a stem.

FIG. 11 provides an alternative embodiment of the stem. Unless stated otherwise, the stem is according to the previous embodiment and has a first, second and third section 10, 12, 14 respectively.

In the alternative embodiment the capsule forms a concave surface 40 where the handle bar sits against this concave surface 40. The concave surface 40 forms part of a concave cap 42 which is removable to access the power supply device 20 therein. A plurality of screw bosses 44 are formed in the concave surface 40 passing through the concave cap 42. The screw bosses 44 allow the removal of the capsule by the insertion of screws into the bosses 44 and withdrawal from the third section 14 through the aperture (second aperture) in the second section 12. The screw bosses 44 can also be seen in FIG. 12. The screw basses 44 can alternatively be used for removal of the concave cap 42.

Alternative means for withdrawing the capsule through the aperture can be provided, such as a recess, groove or projection.

Around the neck or circumference of the concave cap 42 is a groove or recess 46. This groove 46 abuts the body of the second or third section 12, 14 and can be provided with a seal ring to seal the interior of the third section from ingress of materials such as water or dust and to also seal the compartment from expelling any materials. The seal ring can also be used to secure the capsule in place inside the body of the third section 14.

A power button 48 is provided on the casing 22 of the capsule. This is provided on the top of the casing 22 when in use. The power button 48 can be used for actuating the power supply device 20. The power button 48 has an LED located on or near its location for indicating a charge level. Therefore the power button 48 has the impression of an illuminated power button.

The LED and power button 48 can have different functions, such as illumination to indicate a notification of an attached device.

On top of the power button 48 and protruding through an aperture in the third section 14 is a spacer 50. The spacer 50 can be clear to allow the viewing of the LED below. The spacer 50 is actuatable to activate the power button 48. Therefore the spacer 50 can be moveable within the aperture or can be made from a resiliently deformable material such as rubber. A seal is provided on top of the 50 to prevent water and dust ingress.

Figure 12:
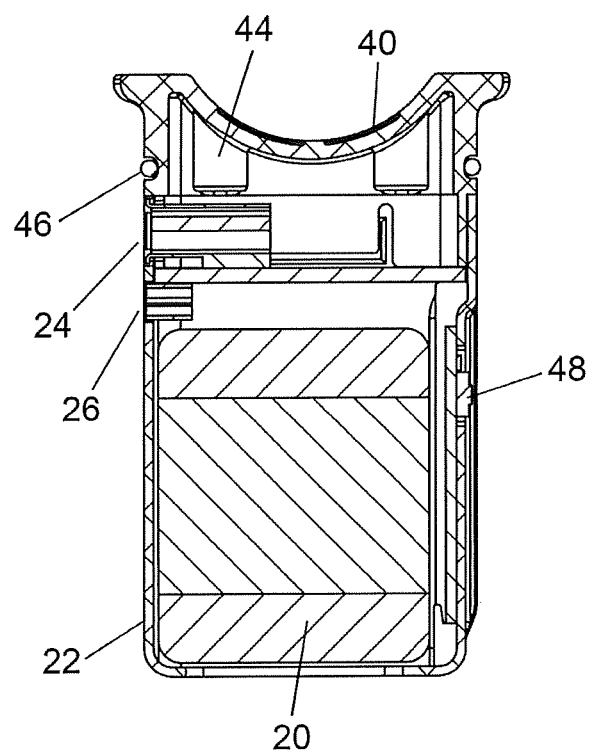
FIG. 12 is a section side view of a capsule according to the embodiment of FIG. 11.

In the embodiment of FIGS. 11 and 12, the first and second connectors 24, 26 are recessed such that they are flush with the casing 22 of the capsule. An aperture is formed in the third section 14 which provides access to the first and second connectors 24, 26. A sealing bung 52 is provided which can be removably fastened over the aperture. The sealing bung 52 can be removed for access to the connectors 24, 26 and provides a seal against water, dust and other materials when in place. The sealing bung 52 has a lip for easy removal and replacement. Although not shown, a device cable can be provided which also has an overmould for sealing in the same aperture as the sealing bung 52 sits in to prevent ingress of dirt and the like when the connections are in use.

The above described stem may be used in other applications besides a bicycle where a stem is conventionally used. For example, the stem may be included in tricycle.

It will be appreciated by persons skilled in the art that various modifications are possible to the embodiments.

The applicant hereby discloses in isolation each individual feature or step described herein and any combination of two or more such features, to the extent that such features or steps or combinations of features and/or steps are capable of being carried out based on the present specification as a whole in the light of the common general knowledge of a person skilled in the art, irrespective of whether such features or steps or combinations of features and/or steps solve any problems disclosed herein, and without limitation to the scope of the claims. The applicant indicates that aspects of the present invention may consist of any such individual feature or step or combination of features and/or steps. In view of the foregoing description it will be evident to a person skilled in the art that various modifications may be made within the scope of the invention.

The invention claimed is:

1. A stem for a bicycle, comprising:
    a body having at least one first aperture and a second aperture therein;
    an electrical device located within the body;
    connecting means for enabling electrical connection through the at least one first aperture, to enable supply of power to the device,
    wherein the second aperture enables insertion of the device into the body and removal therefrom, and
    the stem further comprising a closure member for sealingly closing the second aperture, wherein the closure member includes a concave surface portion configured to fit against an outer surface of a handlebar, wherein a handlebar is attachable to the stem over the second aperture.

2. The stem of claim 1, wherein the connecting means comprises a first electrical connector element electrically connected to the device, wherein the first connector element is located at the at least one first aperture, and wherein the first connector element is configured for connection to a first connector external to the stem.

3. The stem of claim 2, wherein the first connector is connected to an external power source for supply of power to the device or connected to an external device for supply of power from the device to the external device.

4. The stem of claim 2, wherein the connecting means further comprises a second electrical connector element electrically connected to the device, wherein the second connector element is also located at the at least one first aperture, and wherein the second connector element is configured for connection to a second connector of a different type to the first connector, also external to the stem.

5. The stem of claim 4, wherein the second connector is connected to an external power source for supply of power to the device, or connected to an external device supply of power from the device to the external device.

6. The stem of claim 4, wherein the at least one first aperture comprises two first apertures, wherein the first connector element is located in one of the two first apertures and the second connector element is located in a second of the two first apertures.

7. The stem of claim 1, wherein the body comprises:
a first portion attachable to a bicycle fork;
a second portion attachable to a handlebar; and
a hollow third portion extending between the first portion and the second portion,
wherein the device is located within the third portion.

8. The stem of claim 7, wherein the second aperture is located in the second portion, providing an opening to the third portion.

9. The stem of claim 7, further comprising a third aperture in a top region of the third portion.

10. The stem of claim 9, wherein a cover seals the third aperture.

11. The stem of claim 9, further comprising a display means mounted in or over the third aperture, so as to provide a visual indication of data to a rider of the bicycle, wherein the display means is coupled to the device and the device is configured to provide said data to the display means for display on the display means, wherein the cover is see-through, enabling a rider to view the display means.

12. The stem of claim 1, wherein the device comprises a power storage means.

13. The stem of claim 1, wherein the device comprises a housing and the connecting means is mounted on the housing, wherein the housing and an interior surface of the body are respectively shaped so that the housing self-locates when the device is located in the body, such that the connecting means aligns with the at least one first aperture.

14. The stem of claim 1, further comprising solar cells on an outer portion thereof, wherein the solar cells are electrically connected to the device via the connecting means for charging of the device.

15. The stem of claim 1, wherein the device includes part of an electronic gear change system.

16. A method of locating a device in a stem of a bicycle, comprising:
inserting a device through a second aperture in a body of the stem and locating connecting means inserted through the second aperture at at least one first aperture in the body;
locating a closure member to sealingly close the second aperture, wherein the closure member includes a concave surface portion configured to fit against an outer surface of a handlebar;
attaching a handlebar to the stem, wherein the attached handlebar covers the second aperture,
wherein the connecting means enables electrical connection through the at least one first aperture for supply of power to the device.

17. The method of claim 16, wherein the connecting means comprises first and second connector elements, each being connectable to a connector of an external device and/or a connector of an external power supply for charging, wherein the first connector element is of a different type to the second connector element, wherein the locating comprises locating the device so that the first and second connect.

18. The method of claim 17, wherein the locating of the connecting means comprises locating the first and second connector elements at the at least one first aperture.

19. The method of claim 16, further comprising locating the device so that a display means thereof is mounted in the stem visible through a third aperture in a top portion of the stem.

20. The method of claim 16, wherein the device comprises a power supply means, wherein the connecting means enables electrical connection through the at least one first aperture between the device and an external device.

* * * * *